(12) United States Patent
Yamamoto

(10) Patent No.: US 10,600,161 B2
(45) Date of Patent: Mar. 24, 2020

(54) IMAGE CORRECTION DEVICE

(71) Applicant: Yamaha Corporation, Hamamatsu, Shizuoka (JP)

(72) Inventor: Kazuhiko Yamamoto, Shizuoka (JP)

(73) Assignee: YAMAHA CORPORATION, Shizuoka (JP)

(*) Notice: Subject to any disclaimer, the term of this patent is extended or adjusted under 35 U.S.C. 154(b) by 172 days.

(21) Appl. No.: 15/936,102

(22) Filed: Mar. 26, 2018

(65) Prior Publication Data

US 2018/0218479 A1 Aug. 2, 2018

Related U.S. Application Data

(63) Continuation of application No. PCT/JP2016/079016, filed on Sep. 30, 2016.

(30) Foreign Application Priority Data

Sep. 30, 2015 (JP) ................. 2015-194928

(51) Int. Cl.
*G06T 5/00* (2006.01)
*G06K 9/32* (2006.01)
(Continued)

(52) U.S. Cl.
CPC ............. *G06T 5/006* (2013.01); *G06K 9/00* (2013.01); *G06K 9/3283* (2013.01);
(Continued)

(58) Field of Classification Search
CPC .. G06T 5/006; G06T 5/00; G06T 3/00; G06T 3/0006; G06T 3/0012; G06T 2207/10004;
(Continued)

(56) References Cited

U.S. PATENT DOCUMENTS 5,497,236 A 3/1996 Wolff et al.
2004/0218069 A1* 11/2004 Silverstein .............. G06T 5/005
348/239

(Continued)

FOREIGN PATENT DOCUMENTS

JP S63-15373 A 1/1988
JP H04-37968 A 2/1992
(Continued)

OTHER PUBLICATIONS

International Search Report in PCT/JP2016/079016 dated Dec. 27, 2016.

*Primary Examiner* — Dwayne D Bost
*Assistant Examiner* — Stephen M Brinich
(74) *Attorney, Agent, or Firm* — Global IP Counselors, LLP

(57) ABSTRACT

An image correction device includes a line segment detection module, a shape specification module and an image correction module. The line segment detection module detects from a captured image obtained by photographing a document a plurality of line segments that correspond to the notation on the surface of the document. The shape specification module specifies shape approximation lines that approximate the surface shape of the document from the plurality of line segments. The image correction module utilizes the shape approximation lines specified by the shape specification module to correct the captured image.

14 Claims, 7 Drawing Sheets

(51) Int. Cl.
*G06K 9/62* (2006.01)
*G06K 9/00* (2006.01)

(52) U.S. Cl.
CPC ......... *G06K 9/6218* (2013.01); *G06K 9/6267* (2013.01); *G06K 2209/501* (2013.01); *G06T 2207/10004* (2013.01); *G06T 2207/30176* (2013.01)

(58) Field of Classification Search
CPC . G06T 2207/10008; G06T 2207/30176; G06T 2207/30172; G06K 9/00; G06K 9/3283; G06K 9/3275; G06K 9/6218; G06K 9/6217; G06K 9/6219; G06K 9/6267

USPC ........ 382/275, 267–269, 312–313, 316–318, 382/192–193

See application file for complete search history.

(56) References Cited

U.S. PATENT DOCUMENTS

| | | |
|---|---|---|
| 2006/0140504 A1 | 6/2006 | Fujimoto et al. |
| 2009/0158915 A1 | 6/2009 | Ishii et al. |
| 2010/0014782 A1* | 1/2010 | Fero ..................... G06K 9/3275 382/290 |
| 2013/0124159 A1* | 5/2013 | Chen ..................... G06T 5/006 703/2 |
| 2014/0140621 A1* | 5/2014 | Wu ..................... G06K 9/3283 382/176 |
| 2014/0292802 A1 | 10/2014 | Chen |

FOREIGN PATENT DOCUMENTS

| | | |
|---|---|---|
| JP | H05-219323 A | 8/1993 |
| JP | H07-95387 A | 4/1995 |
| JP | 2008-252945 A | 10/2008 |
| JP | 2009-151712 A | 7/2009 |
| JP | 2013-93704 A | 5/2013 |
| JP | 2014-192901 A | 10/2014 |
| WO | 2005041125 A1 | 5/2005 |

* cited by examiner

IMAGE CORRECTION DEVICE

CROSS-REFERENCE TO RELATED APPLICATIONS

This application is a U.S. continuation application of International Application No. PCT/JP2016/079016, filed Sep. 30, 2016, which claims priority to Japanese Patent Application No. 2015-194928, filed Sep. 30, 2015. The entire disclosures of International Application No. PCT/JP2016/079016 and Japanese Patent Application No. 2015-194928 are hereby incorporated herein by reference.

BACKGROUND

Field of the Invention

The present invention relates to a technique for correcting an image obtained by photographing a document.

Background Information

In regard to a photographed image of a document, such as that of printed matter or of the text of a book in which various types of information are written, distortion of the notation on paper caused by deformation of the document surface (typically, bending) may occur. Japanese Laid-Open Patent Application No. 2013-93704 (hereinafter referred to as Patent Document 1) discloses a technique in which distances to the surface of a book within an imaging range are measured at a plurality of points by a measuring device, and the distortion in the notation caused by deformation of the surface of the book is corrected according to the distance measurement result.

SUMMARY

However, in the technique of Patent Document 1, since a distance measuring device for measuring the distance from the surface of the book at a plurality of points is required, there is the problem that the composition of the device becomes complex, and by extension, the manufacturing cost and the device size are increased. In view of the circumstance described above, an object of the present invention is to correct distortion of an image caused by deformation of the surface of a document by a simple configuration and processing.

In order to realize the object described above, an image correction device according to one aspect of the present invention comprises a line segment detection module that detects, from a captured image obtained by photographing a document, a plurality of line segments that correspond to the notation on the surface of the document; a shape specification module that specifies shape approximation lines that approximate the surface shape of the document from the plurality of line segments; and an image correction module that utilizes the shape approximation lines specified by the shape specification module to correct the captured image.

DETAILED DESCRIPTION OF THE EMBODIMENTS

Figure 1:
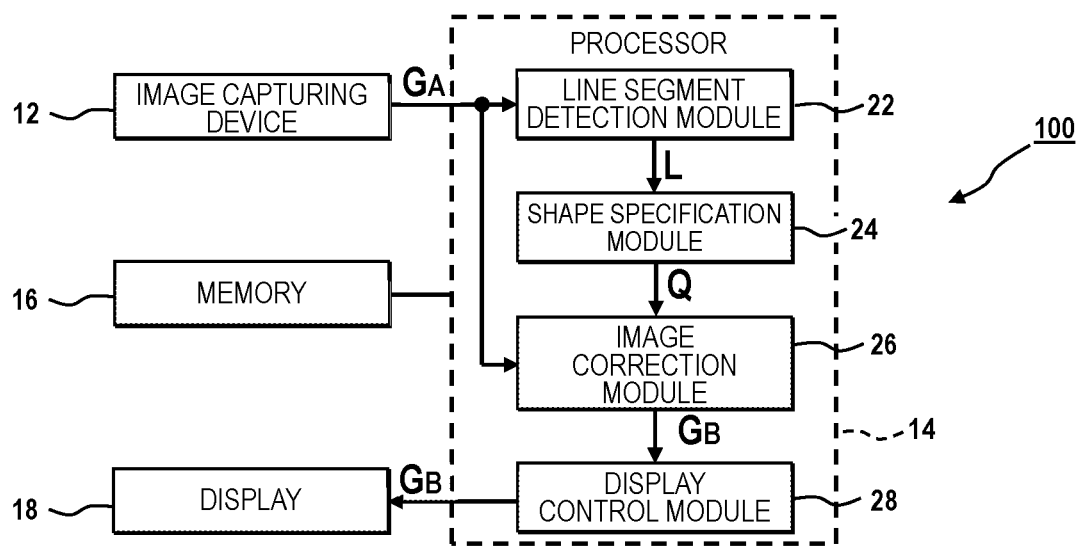
FIG. 1 is a block diagram of the image correction device according to the first embodiment of the present invention.

Select embodiments of the present invention will be described below with reference to the drawings. Moreover, identical elements have been assigned the same reference symbols in the drawings, and redundant descriptions have been omitted.

First Embodiment

FIG. 1 is a block diagram of the image correction device 100 according to the first embodiment. As illustrated in FIG. 1, the image correction device 100 according to the first embodiment is realized by a computer system equipped with an image capturing device 12, an electronic controller 14 (simply referred to as "controller" hereinafter), a storage device or memory 16 and a display 18. For example, a portable information processing device such as a mobile phone and a smartphone, or a portable or stationary information processing device such a personal computer can be used as the image correction device 100. In addition, it is also possible to realize the image correction device 100 by photographing equipment (for example, a digital camera, a digital camcorder, etc.) dedicated to photographing still images and moving images.

The image capturing device 12 is an image input device that generates, by photographing a document such as a book or printed matter, an image (hereinafter referred to as "captured image") GA of the document, and comprises an imaging element that converts the incident light from a subject into electronic signals. In the first embodiment, an example is shown of a configuration in which the image capturing device 12 is mounted in the image correction device 100; however, it is also possible to form a wired or wireless connection between the image capturing device 12, which is separate from the image correction device 100, and the image correction device 100. In addition, the format of the image data representing the captured image GA is arbitrary.

Figure 2:
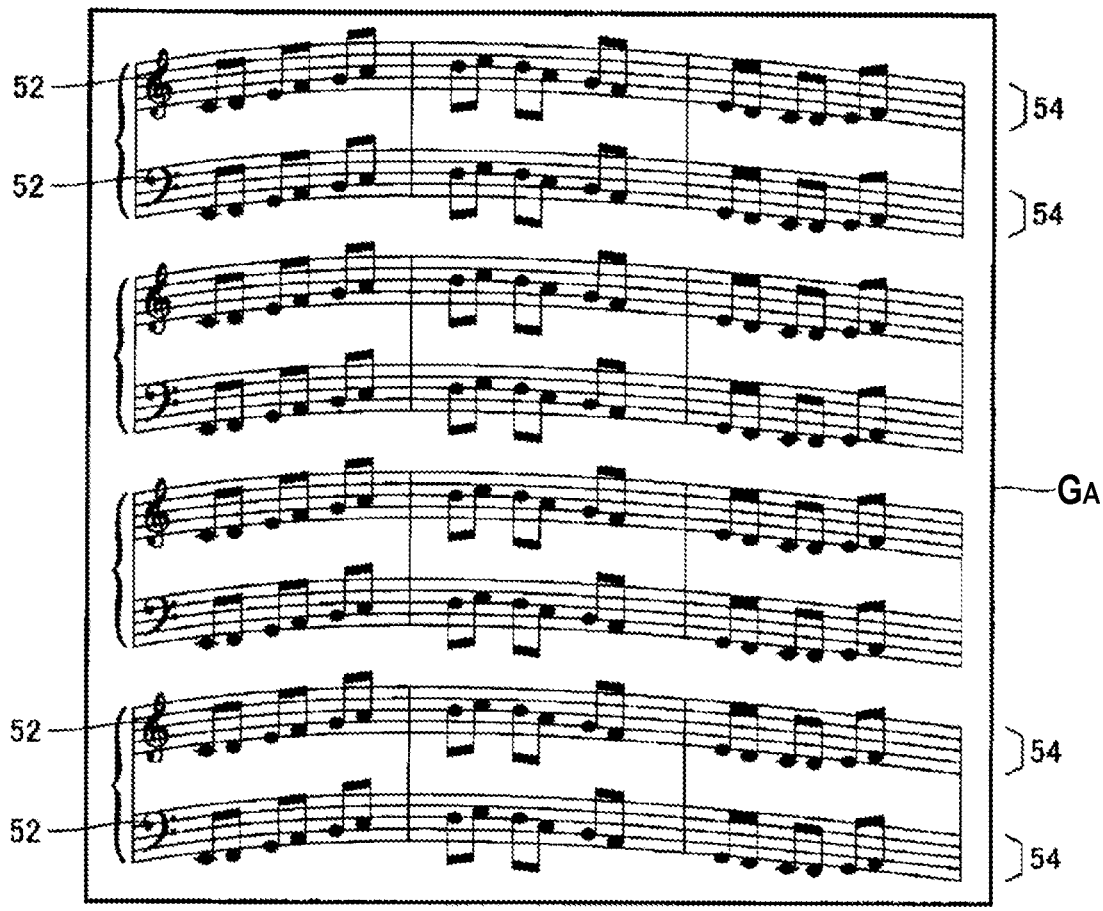
FIG. 2 is an explanatory view of a captured image.

The image capturing device 12 according to the first embodiment generates a captured image GA obtained by photographing a document, such as a book or other printed matter, in which is noted an arbitrary musical score of a musical piece. FIG. 2 is a block diagram of a captured image GA. As illustrated in FIG. 2, the musical score photographed by the image capturing device 12 includes a plurality of staves 54 (staff notation in the example illustrated in FIG. 2), arranged in parallel at an interval from each other in the vertical direction. Each of the plurality of staves 54 is configured from a plurality of straight lines in the horizontal direction representing different pitches. Notation symbols (clefs) 52 such as a G clef and an F clef are disposed in predetermined positions (for example, near the left end) with respect to each of the plurality of staves 54, and signs representing music, such as notes, rests, and variation symbols, are disposed in arbitrary positions of each of the staves 54.

As shown in FIG. 2, distortion caused by deformation of the surface of the document (for example, bending) can occur in the musical score of the captured image GA photographed by the image capturing device 12. In FIG. 2, an example is shown of a state in which the intermediate portion of the document to be photographed in the lateral direction is bent into a curved surface shape so as to be convex toward the front side over the entire area in the vertical direction. The image correction device 100 is an image processing device that generates an image (hereinafter referred to as "corrected image") GB in which the distortion of the musical score of the captured image GA captured by the image capturing device 12 is corrected. That is, a corrected image GB in which the distortion of the musical score is reduced (ideally, eliminated) compared with the captured image GA is generated.

The display 18 of FIG. 1 (for example, a liquid-crystal display panel) displays an image controlled by the controller 14. Specifically, a corrected image GB in which the distortion of the musical score has been corrected is displayed on the display 18. The memory 16 is configured from a well-known storage medium, such as a magnetic storage medium or a semiconductor storage medium, or from a combination of a plurality of types of storage media, and stores a program that is executed by the controller 14, and various data that are used by the controller 14. In other words, the memory 16 is any computer storage device or any computer readable medium with the sole exception of a transitory, propagating signal. For example, the memory 16 can be a computer memory device which can be nonvolatile memory and volatile memory.

The controller 14 includes at least one processor, such as a CPU (Central Processing Unit), and the like. The at least one processor of the controller 14 carries out a plurality of functions (a line segment detection module 22, a shape specification module 24, an image correction module 26, a display control module 28) for generating a corrected image GB by correcting the captured image GA by executing the program stored in the memory 16, as shown in FIG. 1. Moreover, it is also possible to employ a configuration in which a portion of the functions of the controller 14 is realized by a dedicated electronic circuit for image processing or a configuration in which the functions of the controller 14 are distributed among a plurality of devices.

The line segment detection module 22 detects a plurality of line segments L corresponding to the notations on the surface of the document (that is, the musical score) from the captured image GA generated by the image capturing device 12. A known feature extraction (straight line detection) method, such as stochastic Hough transform, is arbitrarily employed for the detection of the line segment L by the line segment detection module 22.

Figure 3:
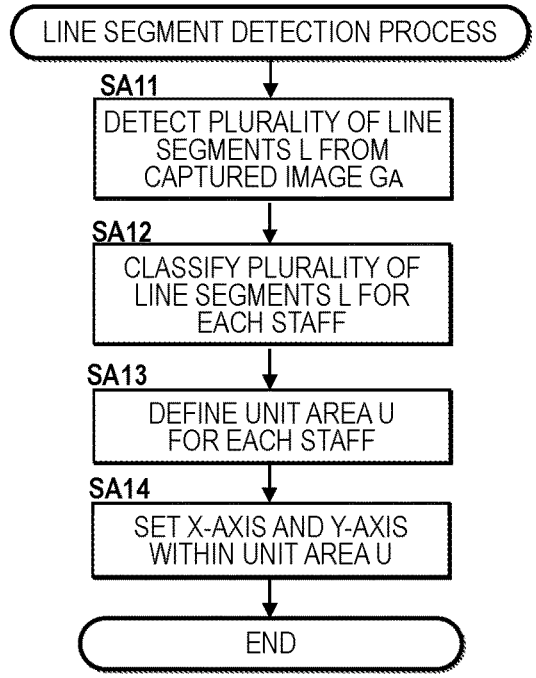
FIG. 3 is a flowchart of a line segment detection process.
Figure 4:
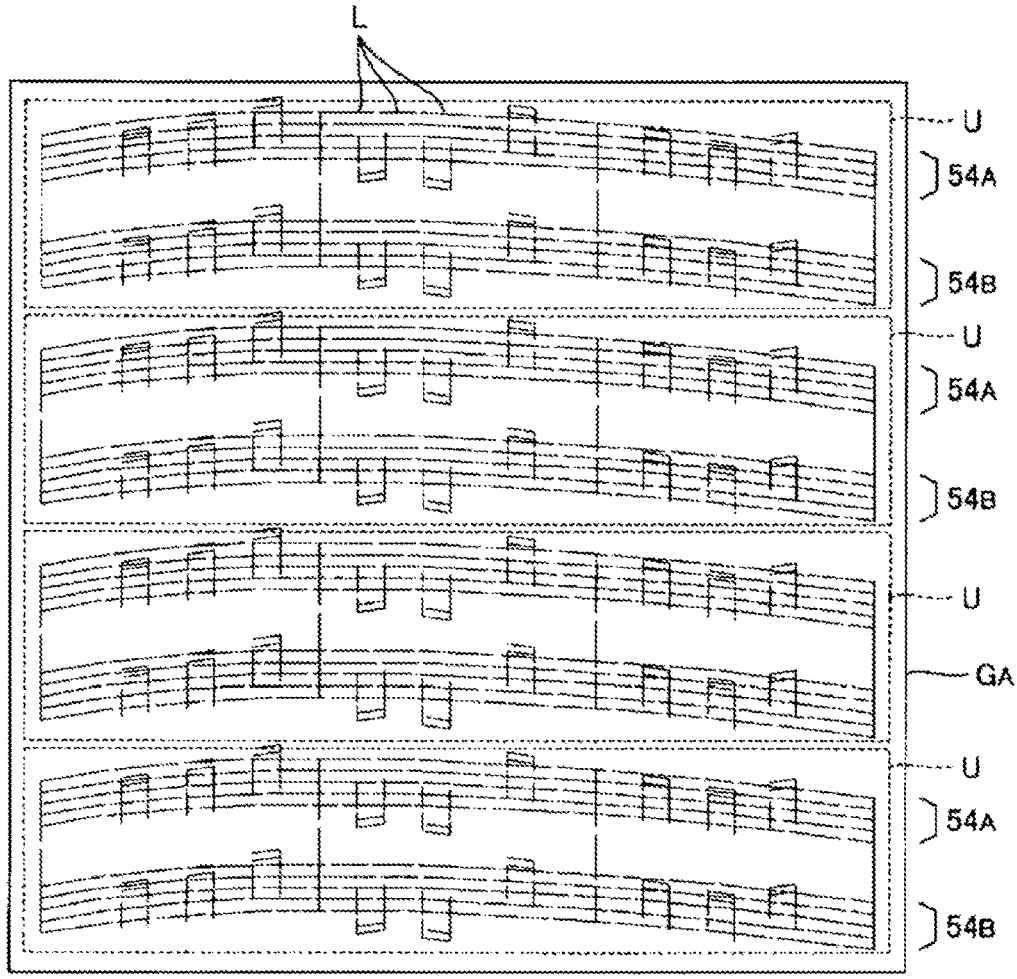
FIG. 4 is an explanatory view of a line segment detection process.
Figure 5:
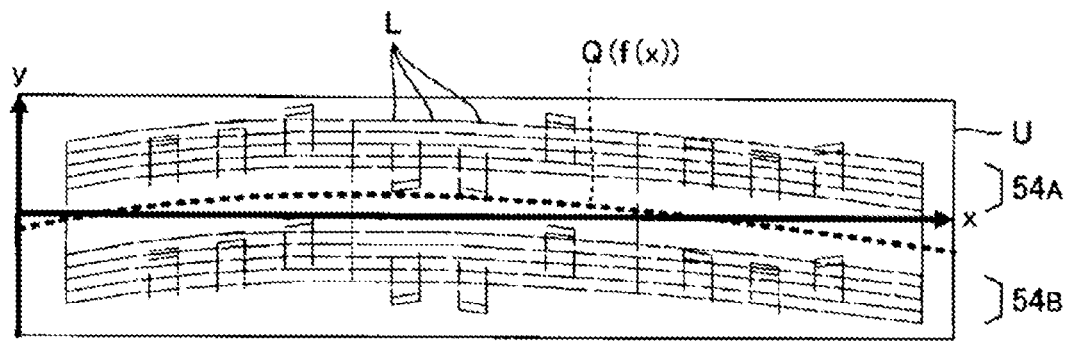
FIG. 5 is an explanatory view of a line segment detection process.

FIG. 3 is a flowchart of a process for detecting a plurality of line segments L from the captured image GA by the line segment detection module 22 (hereinafter referred to as "line segment detection process"), and FIG. 4 and FIG. 5 provide explanatory views of the line segment detection process. For example, the line segment detection process of FIG. 3 is initiated by means of an instruction from the user after the generation of the captured image GA by the image capturing device 12.

When the line segment detection process is started, the line segment detection module 22 detects a plurality of line segments L from the captured image GA (SA11). As shown in FIG. 4, a plurality of line segments L constituting each of the staves 54 in the musical score of the captured image GA are detected. In fact, the stem and flag of each musical note, and straight line portions such as bar lines are also detected, but the line segments L that constitute the staves 54 constitute the majority of the notation. The line segment detection module 22 classifies the plurality of line segments L detected from the captured image GA for each staff 54 (SA12). Any method may be used to classify the plurality of line segments L, but a method of classifying a plurality of line segments L for each staff 54 utilizing the musical score symbols 52 disposed in predetermined positions with respect to each staff 54 is suitable. Specifically, the line segment detection module 22 recognizes a plurality of musical score symbols 52 (G clef and F clef) by subjecting the captured image GA to known image recognition processes, and classifies the plurality of line segments L detected from the captured image GA into the same number of sets (clusters) as the number of musical score symbols 52 using a known clustering technique (for example, k-means method). Since musical score symbols 52 are basically disposed for each staff 54, by setting the same number of classifications as the number of musical score symbols 52, it is possible to classify the plurality of line segments L of the captured image GA for each staff 54 with high precision.

The line segment detection module 22 defines a plurality of areas (hereinafter referred to as "unit areas") U corresponding to a set of two vertically adjacent staves 54 in the musical score of the captured image GA (SA13). As shown in FIG. 4, a unit area U of the first embodiment is an area that corresponds to a grand staff in which a staff 54A having a G clef and a staff 54B having an F clef are arranged in parallel at an interval in the vertical direction. As can be understood from the description above, the line segment detection module 22 according to the first embodiment detects a plurality of line segments L included in each of the plurality of unit areas U within the captured image GA.

As shown in FIG. 5, the line segment detection module 22 sets an x-axis and a y-axis orthogonal to each other in each unit area U (SA14). The y-axis is parallel to the vertical direction of the captured image GA, and the x-axis is an axis parallel to the horizontal direction. As shown in FIG. 5, the midpoint of the line parallel to the y-axis positioned at the left end of the unit area U is set as the intersection of the x-axis and the y-axis (i.e., the origin). Therefore, the majority of line segments L corresponding to the staff 54A in which the G clef is disposed are distributed on the positive side region of the y-axis, as viewed from the x-axis, and the majority of line segments L corresponding to the staff 54B in which the F clef is disposed are distributed on the negative side region of the y-axis, as seen from the x-axis. Therefore, the line segments L of the staff 54A in which the G clef is disposed and the line segments L of the staff 54B in which the F clef is disposed tend to be positioned on mutually opposite sides of the x-axis. With the execution of the line segment detection process by the line segment detection module 22 described above by way of example, a plurality of line segments L that are distributed in the x-y plane is specified for each of the plurality of unit areas U of the captured image GA (that is, for each grand staff). In the description below, the case in which N line segments L are included in one arbitrary unit area U will be assumed. The total number N of the line segments L may be different for each unit area U.

The shape specification module 24 of FIG. 1 specifies a shape approximation line Q, which approximates the surface shape of the document photographed by the image capturing device 12, from the plurality of line segments L detected by the line segment detection module 22. The shape approximation line Q is a curve representing a state in which one straight line extending in the horizontal direction within the musical score is curved. The shape specification module 24 according to the first embodiment specifies, for each of the plurality of unit areas U of the captured image GA, a shape approximation line Q from the plurality of line segments L within the unit area U. The shape approximation line Q of one arbitrary unit area U approximates the surface shape of the musical score within the unit area U.

The shape approximation line Q is represented by the function f(x) in the x-y plane. The specific format of the function f(x) is arbitrary; for example, a shape approximation line Q may be represented by the function f(x) of the following formula (1) including a trigonometric function. The variable $\theta k$ (k=0, 1, 2, . . . ) of formula (1) is limited to a numerical value within a predetermined range (for example, $-1 < \theta k < 1$).

$$f(x) = \theta_n + \theta_1 \sin(\theta_2 x + \theta_3) + \theta_4 \sin(\theta_5 x + \theta_6) + \quad (1)$$

Figure 6:
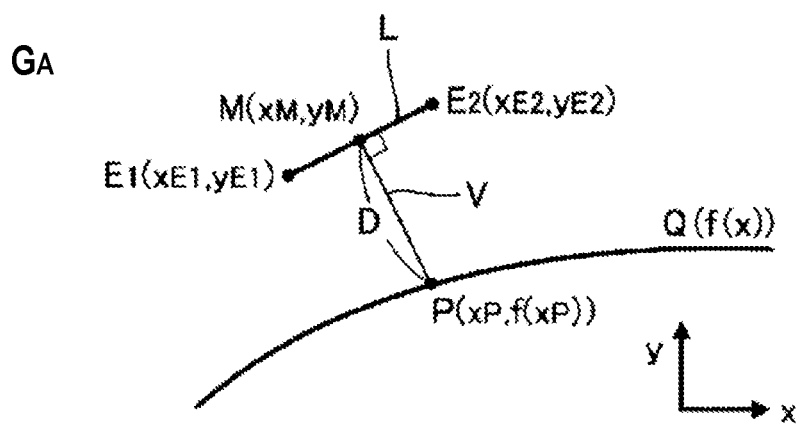
FIG. 6 is an explanatory view of a process for specifying a shape approximation line.

FIG. 6 provides an explanatory view of the process in which the shape specification module 24 specifies the shape approximation line Q (function f(x)). FIG. 6 illustrates one arbitrary line segment L within the unit area U and a shape approximation line Q represented by the function f(x). One end point E1 of the line segment L is positioned at the coordinate (xE1, yE1), and the other end point E2 is positioned at the coordinate (xE2, yE2).

As shown in FIG. 6, the case in which a straight line V that passes through a specific point (hereinafter referred to as "specific point") M on one arbitrary line segment L intersects the shape approximation line Q at point of intersection P will be assumed. Specifically, the straight line V is perpendicular to the line segment L. In addition, the specific point M of the first embodiment is a midpoint of the line segment L and is positioned at the coordinate (xM, yM) (xM=(xE1+xE2)/2, yM=(yE1+yE2)/2). The point of intersection P of the straight line V and the shape approximation line Q is positioned at the coordinate (xP, f(xP)).

The shape specification module 24 according to the first embodiment specifies the shape approximation line Q (function f(x)) so as to minimize an index (hereinafter referred to as "distance index") Z(x) obtained by adding the distance D between the specific point M on the line segment L and the point of intersection P on the shape approximation line Q for N line segments L within the unit area U. That is, the shape specification module 24 specifies the shape approximation line Q such that the intervals (distances D) between the line segments L and the shape approximation line Q are reduced as a whole. Specifically, the process for the shape specification module 24 of the first embodiment to specify the shape approximation line Q is represented by the following formula (2) and formula (3).

Formula (2)

$$\arg\min_{xP, \theta_k} Z(x) = \sum_N \{(xP - xM)^2 + (f(xP) - yM)^2\} + \int f(x)^2 dx \quad (2)$$

Formula (3)

$$\text{subject to: } (xP - xM, f(xP) - yM) \cdot (xE2 - xE1, yE2 - yE1) = 0 \quad (3)$$

As can be understood from the description above, the shape specification module 24 according to the first embodiment specifies a function f(x) that represents the shape approximation line Q by selecting a coordinate of the point of intersection P (xP, f(xP)) and the variable $\theta k$ of the function f(x), such that the distance index Z(x) is minimized under the condition of formula (3). The first term on the right side of formula (2) is the summation of the distances D across N line segments L (D=(xP-xM)²+(f(xP)-yM)²), and the second term is a normalization term for suppressing divergence of the optimal solution of the distance index Z(x). In addition, formula (3) specifies a condition in which the straight line V and the line segment L in FIG. 6 are orthogonal. Any known optimization method may be employed for specifying the shape approximation line Q (calculating formula (2) and formula (3)), but an analytic optimization method, such as the Lagrange (Lagrange) undetermined multiplier method, is preferable.

Figure 7:
FIG. 7 is an explanatory view of a process for correcting the captured image.

The image correction module 26 in FIG. 1 utilizes the shape approximation line Q (function f(x)) specified by the shape specification module 24 to correct the captured image GA. For example, the image correction module 26 generates a corrected image GB by moving each pixel of the captured image GA within the unit area U in the x-y plane such that the shape approximation line Q of each unit area U is converted into a straight line parallel to the x-axis (that is, so that the curvature of each staff 54 is eliminated). Specifically, for example, as shown in FIG. 7, a corrected image GB is generated by moving each pixel of the captured image GA within the unit area U by a distance corresponding to the function value of the function f(x) (difference between function f(x) and straight line y=0) in the y-axis direction. However, the method for correcting the captured image GA utilizing the shape approximation line Q is not limited to the example described above. The display control module 28 in FIG. 1 displays the corrected image GB generated by the image correction device 26 on the display 18.

Figure 8:
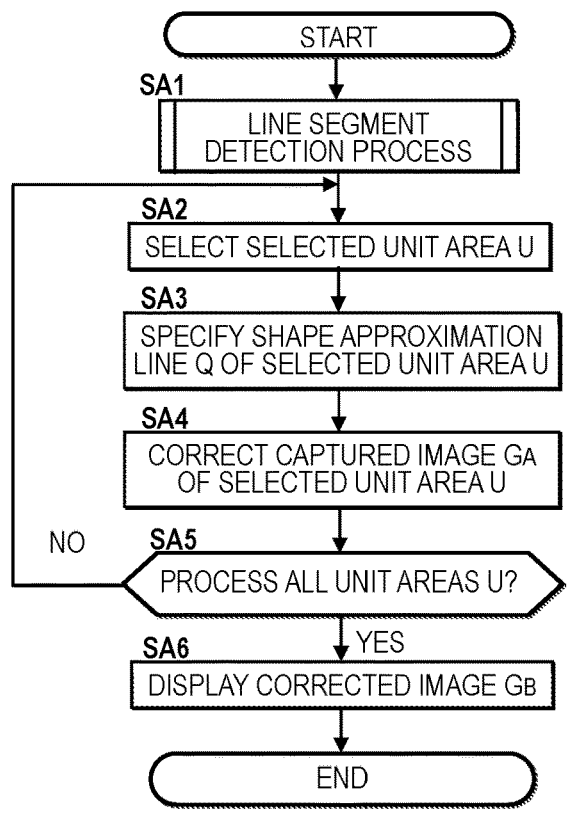
FIG. 8 is a flowchart of an image correction process.

FIG. 8 is a flowchart of a process in which the image correction device 100 corrects the captured image GA (hereinafter referred to as "image correction process"). The image correction process of FIG. 8 is initiated by means of an instruction from the user after the generation of the captured image GA by the image capturing device 12.

When the image correction process is initiated, the controller 14 (line segment detection module 22) detects a plurality of line segments L corresponding to the musical score notated on the surface of the document photographed by the image capturing device 12 from the captured image GA, by the line segment detection process illustrated in FIG. 3 (SA1). Specifically, a plurality of line segments L included in each of the plurality of unit areas U corresponding to the grand staff in the musical score are detected.

The controller 14 selects one unit area (hereinafter referred to as "selected unit area") U from among the plurality of unit areas U within the captured image GA (SA2). Then, the controller 14 (the shape specification module 24) utilizes the plurality of line segments L within the selected unit area U to specify a shape approximation line Q (function f(x)) that approximates the surface shape of the document within the selected unit area U (SA3). In addition, the controller 14 (the image correction device 26) utilizes the shape approximation line Q specified by the shape specification module 24 with respect to the selected unit area U to correct the selected unit area U of the captured image GA (SA4).

The controller 14 determines whether or not the process described above has been completed for all of the unit areas U of the captured image GA (SA5). If the determination result is negative (SA5: NO), the controller 14 selects an unprocessed unit area U as the new selected unit area U (SA2) and executes a specification of a shape approximation line Q utilizing the plurality of line segments L within the selected unit area (SA3) and a correction of the captured image GA utilizing the shape approximation line Q (SA4). That is, the specification of the shape approximation line Q and the correction of the captured image GA are sequentially carried out for each unit area U of the captured image GA (for each grand staff of the musical score). On the other hand, when the specification of the shape approximation line Q (SA3) and the correction of the captured image GA (SA4) are executed for all of the unit areas U (SA5: YES), the controller 14 (display control module 28) causes the display 18 to display the corrected image GB, obtained by correcting each unit area U of the captured image GA by the shape approximation line Q of the unit area (SA6).

As described above, in the first embodiment, a plurality of line segments L are detected from a captured image GA obtained by photographing a document in which a musical score is notated, a shape approximation line Q corresponding to the distribution of the plurality of line segments L is specified, and the captured image GA is corrected utilizing the shape approximation line Q. Therefore, a distance measuring device for measuring the distance from the document at a plurality of points is not required, and it is possible to correct the distortion of a musical score caused by deformation of the surface of the document by a simple configuration and process.

In addition, in the first embodiment, since a shape approximation line Q is specified so as to minimize a distance index Z(x) which obtained by adding the distances D between the line segment L and the shape approximation line Q for N line segments L (that is, the distribution of the plurality of line segments L is reflected in the shape approximation line Q), there is the advantage that it is possible to specify an appropriate shape approximation line Q that approximates the surface shape of the document with high precision. In the first embodiment, since the shape approximation line Q is specified from a plurality of line segments L corresponding to two mutually adjacent staves 54 (i.e., a grand staff), compared with a configuration in which a shape approximation line Q is specified from only one staff 54, it is possible to specify an appropriate shape approximation line Q that approximates the surface shape of the document with high precision.

Second Embodiment

The second embodiment of the present invention will now be described. In each of the embodiments illustrated below, elements that have the same actions and functions as in the first embodiment have been assigned the same reference symbols as those used to describe the first embodiment, and detailed descriptions thereof have been omitted where appropriate.

Figure 9:
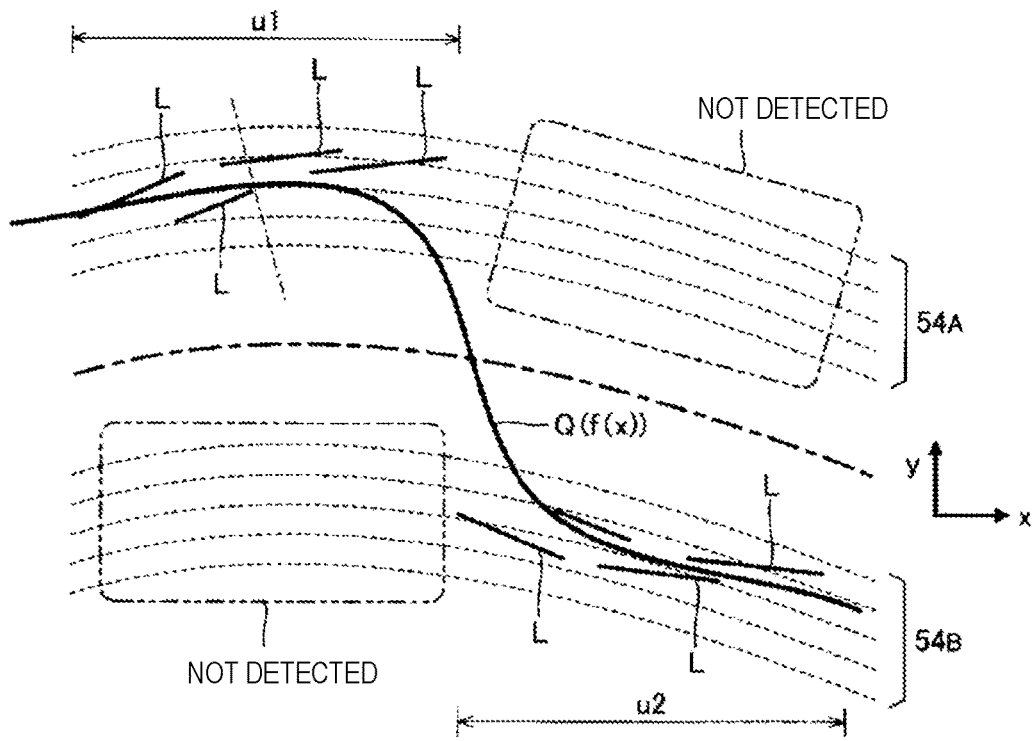
FIG. 9 is an explanatory view of a problem due to uneven distribution of a plurality of line segments.

In the first embodiment, a shape approximation line Q in accordance with the distribution of the plurality of line segments L corresponding to two staves 54 adjacent to each other in the vertical direction is specified. As illustrated in the example of FIG. 5, when a line segment L is evenly detected with respect to a staff 54A corresponding to the G clef and a staff 54B corresponding to the F clef of a grand staff, the shape approximation line Q that appropriately approximates the surface shape of the document is specified between the staff 54A and the staff 54B. However, it is actually difficult to detect a line segment L with a line segment detection process with high precision. For example, an uneven distribution in the line segment L can occur, e.g.: over a specific section u1 of the unit area U in the x-axis direction, the line segment L of the staff 54A may be inappropriately detected as a line segment L of the staff 54B, and over another section u2 in the x-axis direction, the line segment L of the staff 54B may be inappropriately detected as a line segment L of the staff 54A, as shown in FIG. 9, If the uneven distribution of the line segment L illustrated above occurs in the first embodiment, as shown in FIG. 9, a shape approximation line Q is specified so as to reflect the localized distribution of the line segment L, and there is the possibility that a shape approximation line Q that appropriately approximates the surface shape of the document (the chain line between the staff 54A and the staff 54B of FIG. 9) cannot be specified. Considering the situation described above, in the second embodiment, the distance index Z(x) is adjusted such that a shape approximation line Q that approximately approximates the surface shape of the document is specified even when the line segments L are unevenly distributed to one of the staff 54A side and the staff 54B side.

Figure 10:
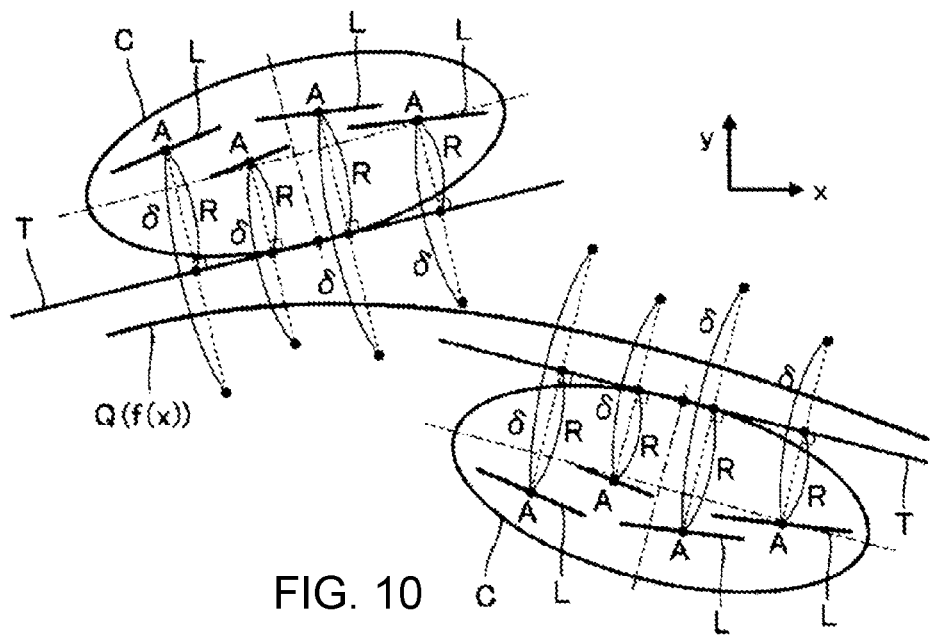
FIG. 10 is an explanatory view of a process for specifying a shape approximation line by the shape specification module according to the second embodiment.
Figure 11:
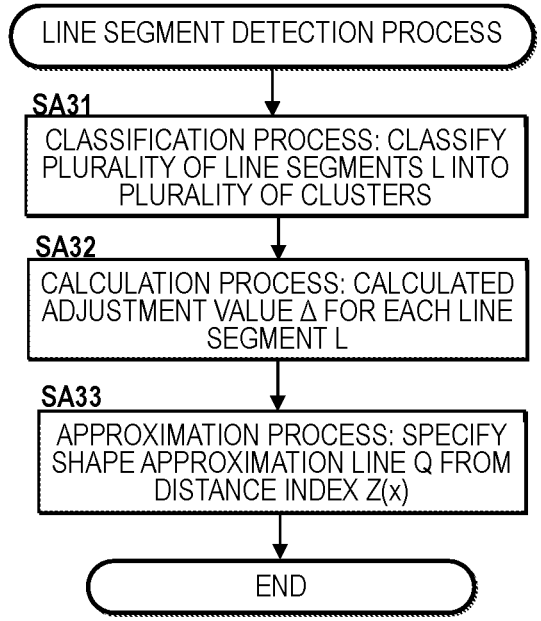
FIG. 11 is a flowchart of a process for specifying a shape approximation line in the second embodiment.

FIG. 10 provides an explanatory view of a process for specifying a shape approximation line Q of a selected unit area U by a shape specification module 24 according to the second embodiment, and FIG. 11 is a flowchart of an operation of the shape specification module 24 according to the second embodiment. The process of FIG. 11 is executed in Step SA3 of FIG. 8.

When the process of FIG. 11 is started, the shape specification module 24 of the second embodiment executes a classification process for classifying the plurality of line segments L detected by the line segment detection module 22 within the selected unit area U into a plurality of clusters (SA31). Specifically, as shown in FIG. 10, the shape specification module 24 classifies line segments, in which specific points (hereinafter referred to as "analysis points") A on each line segment L adjacent to each other in the x-y plane, are classified into a plurality of clusters, and defines an ellipse C representing each cluster. An analysis point A is, for example, the midpoint of the line segment L, in the same manner as the specific point M. In addition, an ellipse C representing one arbitrary cluster is defined so as to include analysis points A of a plurality of line segments L classified into said cluster with the minimum area. As can be understood from FIG. 10, a set of a plurality of line segments L unevenly distributed on one of the staff 54A side (positive side of the y-axis) and the staff 54B side (negative side of the y-axis) is classified into one cluster. Any known clustering technique such as the k-means method can be employed for the classification of the plurality of line segments L.

The shape specification module 24 executes a calculation step for calculating an adjustment value δ for each of the plurality of line segments L within the selected unit area U (SA32). The adjustment value S of one arbitrary line segment L is set to a numerical value corresponding to the distance R between a tangent T to the ellipse E of the cluster to which the line segment L belongs and the line segment L, as shown in FIG. 10. The tangent T to the ellipse C is tangent at the point at which the ellipse C intersects its minor axis (that is, a tangent line parallel to the major axis of the ellipse C), and is positioned on the x-axis side as seen from the center of the ellipse.C. The distance R between the tangent T to the ellipse C and the line segment L is the distance from the analysis point A on the line segment L to the tangent T. Specifically, the shape specification module 24 calculates a numerical value obtained by multiplying a predetermined coefficient a to the distance R as the adjustment value $\delta$ ($\delta=\alpha R$). The coefficient a is a predetermined positive number greater than 1.

When the adjustment value $\delta$ is calculated for each line segment L within the selected unit area U, the shape specification module 24 executes an approximation process for specifying a shape approximation line Q such that the distance index Z(x) is minimized (SA33). The distance index Z(x) of the second embodiment is expressed by the following formula (4).

Formula (4)

$$Z(x) = \sum_N \{(xP - xM)^2 + (f(xP) - yM)^2 + \delta\} + \int f(x)^2 dx \quad (4)$$

As can be understood from formula (4), the distance index Z(x) of the second embodiment includes a numerical value obtained by adding the distance D between the specific point M of the line segment L and the point of intersection P on the shape approximation line Q ($D=(xP-xM)^2+(f(xP)-yM)^2$), and the adjustment value $\delta$ of the line segment L calculated in the calculation step (SA32), for N line segments L. The shape specification module 24 specifies a shape approximation line Q (function f(x)) by selecting a coordinate of the point of intersection P (xP, f(xP)) and the variable Ok of the function f(x) of formula (1), such that the distance index Z(x) of formula (4) is minimized under the condition of formula (3).

Figure 12:
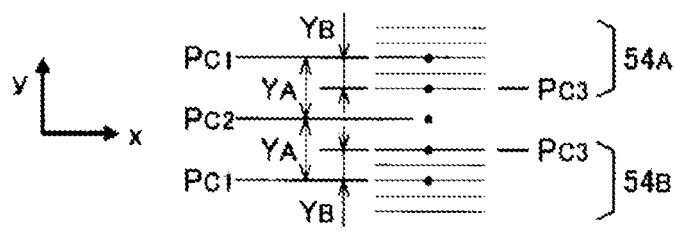
FIG. 12 is an explanatory view of adjustment values.

As shown in FIG. 12, the distance YA from a midpoint PC1 of one arbitrary staff 54A in the y-axis direction to a midpoint PC2 between the staff 54A and the staff 54B is about twice the distance YB from the midpoint PC1 to the outer edge of the staff 54A on the negative side of the y-axis (that is, half the width of the staff 54A) (YA=2YB). Under the assumption described above, for example, by setting the coefficient $\alpha$, which is multiplied by the distance R when calculating the adjustment value $\delta$ ($\delta=\alpha R$), to 2, it is possible to specify an appropriate shape approximation line Q positioned between the staff 54A and the staff 54B. The line segment detection process (SA1) executed by the line segment detection module 22 and the process (SA4) executed by the image correction module 26 to correct the captured image GA by utilizing the shape approximation line Q are the same as in the first embodiment.

The same effect as the first embodiment is realized in the second embodiment. In addition, in the second embodiment, since a shape approximation line Q is specified so as to minimize the distance index Z(x) which obtained by adding the distance D and the adjustment value 8 with respect to N line segments L, there is the advantage that it is possible to specify a shape approximation line Q that approximates the surface shape of the document with high precision, even when a plurality of line segments L are unevenly distributed on one of the staff 54A side and the staff 54B side (for example, when the precision of the line segment detection process is low). In addition, in the second embodiment, there is also the advantage that it is possible to calculate the adjustment value $\delta$ by a simple calculation whereby a predetermined coefficient $\alpha$ is multiplied by the distance R between the tangent T to the ellipse C representing the cluster and the line segment L within the cluster.

Third Embodiment

In the first embodiment, an image correction process of FIG. 8 is executed with respect to one captured image GA generated by the image capturing device 12. In the third embodiment, an image correction process is executed in parallel with the image capture by the image capturing device 12 for each of a plurality of captured images GA that constitute a moving image captured by the image capturing device 12.

Figure 13:
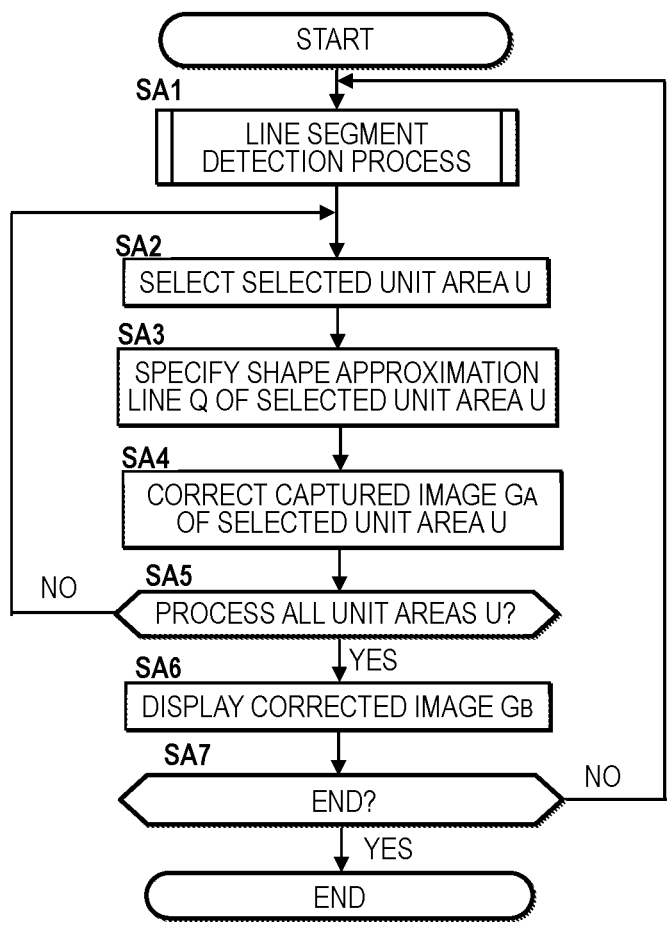
FIG. 13 is a flowchart of an image correction process in the third embodiment.

FIG. 13 is a flowchart of an image correction process in the third embodiment. The capture of a moving image by the image capturing device 12 is initiated, as is the image correction process of FIG. 13, by means of an instruction from the user. The image capturing device 12 of the third embodiment sequentially generates and outputs a plurality of captured images GA that constitute a moving image. When one captured image GA is supplied from the image capturing device 12, the line segment detection process is executed with respect to the captured image GA (SA1) in the same manner as in the first embodiment, and specification of the shape approximation line Q (SA3) and correction of the captured image GA (SA4) are sequentially carried out with respect to each of a plurality of unit areas U, after which the corrected image GB is displayed on the display 18 (SA6).

The user is able to issue a command for ending image capture at any arbitrary point in time. If the user does not issue a command for ending image capture (SA7: NO), the process from Step SA1 to Step SA6 is executed in the same manner with respect to the captured image GA that is supplied immediately afterward from the image capturing device 12. That is, in parallel with the capturing of the moving image by the image capturing device 12, corrected images GB are sequentially generated from each of the captured images GA, and the captured image GB displayed on the display 18 is sequentially updated. If the user issues a command for ending image capture (SA7: YES), image capture executed by the image capturing device 12 and the image correction process are ended.

The same effect as the first embodiment is realized in the third embodiment. It is also possible to apply the configuration of the second embodiment to the third embodiment.

MODIFICATIONS

Each of the embodiments described above by way of example may be variously modified. Specific modified embodiments are illustrated below. Two or more embodiments freely selected from the following examples can be appropriately combined insofar as the combination thereof is not mutually contradictory.

Figure 14:
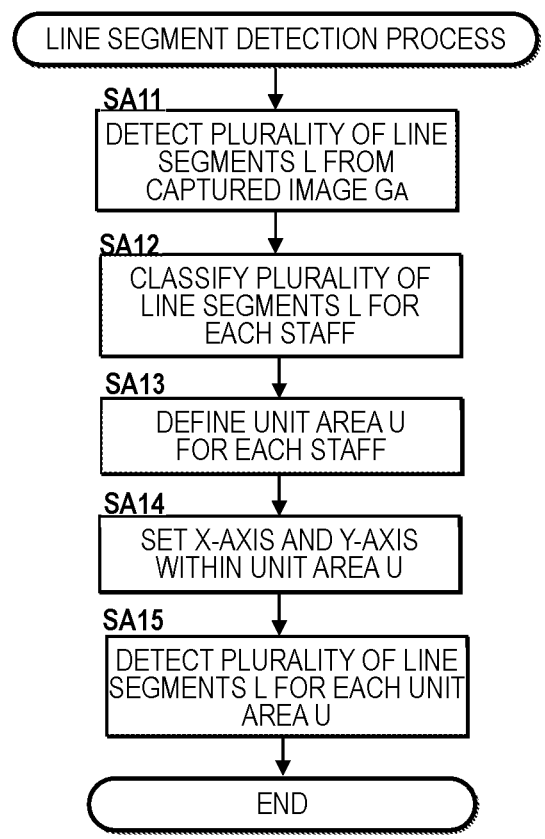
FIG. 14 is a flowchart of the line segment detection process in a modified example.

(1) In each embodiment described above, a plurality of line segments L are detected with respect to the entire range of the captured image GA; however, it is also possible for the line segment detection module 22 to detect a line segment L for each unit area U of the captured image GA. For example, as illustrated in FIG. 14, if a unit area U for each staff 54 is defined (SA13, SA14) by classifying a plurality of line segments L (SA11, SA12) detected with respect to the entire range of the captured image GA, the line segment detection module 22 sequentially detects a plurality of line segments L (SA15) for each of a plurality of unit areas U, with the unit area U of the captured image GA as the search target. That is, a plurality of line segments L are detected in two stages: detection of a line segment L with respect to the entire range of the captured image GA (SA11), and detection of a line segment L with respect to each unit area U (SA15). According to the detection of a line segment L with the unit area U as the search target, it is possible to detect a line segment L with high precision, compared with detection that targets the entire range of the captured image GA. However, detection of the line segment L is not required to define the unit area U (SA13). For example, it is possible for the line segment detection module 22 to detect a plurality of line segments L for each unit area U after defining a plurality of unit areas U by any method (a method not using the line segment L), such as defining unit areas U according to an instruction from the user.

(2) The format of the function f(x) representing the shape approximation line Q is not limited to the Formula (1) described above. A function f(x) of any format, such as a linear function or a quadratic function, may be employed for describing the shape approximation line Q. In addition, it is also possible to utilize a function f(x) selected by the user from among a plurality of types of functions for the shape approximation line Q.

(3) In each of the embodiments described above, a unit area U corresponding to two staves 54 (i.e., a grand staff) was used as an example; however, it is also possible to carry out the specification of the shape approximation line Q (SA3) and the correction of the captured image GA (SA4), for example, for each unit area U corresponding to one staff 54.

(4) In each of the embodiments described above, a case was illustrated in which a document in which a musical score is notated is photographed; however, the image subject to the processing of the image correction device 100 is not limited to a musical score. For example, the image capturing device 12 can also generate a captured image GA obtained by photographing a document in which various texts are inscribed. The line segment detection module 22 detects a plurality of line segments L corresponding to, for example, character strings and rule marks from the captured image GA, and the specification of a shape approximation line Q utilizing the plurality of line segments L (SA3) and correction of the captured image GA utilizing the shape approximation line Q (SA4) are sequentially carried out. As can be understood from the description above, the line segment detection module 22 is comprehensively expressed as an element for detecting a plurality of line segments L corresponding to notations on the surface of various types of documents (for example, musical scores and texts), where the type of document to be photographed by the image capturing device 12 is arbitrary.

(5) It is also possible to realize the image correction device 100 by a server device that communicates with terminal devices (for example, mobile phones and smartphones) via a communication network such as a mobile communication network and the Internet. Specifically, the image correction device 100 receives from a terminal device a captured image GA generated by an image capturing device 12 mounted on the terminal device and transmits a corrected image GB generated by an image correction process (SA1-SA5) carried out with respect to the captured image GA to the terminal device. As can be understood from the description above, the image capturing device 12 is not an essential element of the image correction device 100. In addition, it is also possible to realize the image correction device 100 by means of a group of a plurality of devices configured from separate bodies (for example, a system comprising terminal devices and a server device), and the sharing of functions across the plurality of devices constituting the image correction device 100 is arbitrary.

(6) The image correction device 100 in each of the embodiments described above by way of example is realized by means of cooperative interaction between the controller 14 and a program, as illustrated above. A program according to a preferred embodiment of the present invention causes a computer to function as a line segment detection module 22 that detects, from a captured image GA obtained by photographing a document, a plurality of line segments L that correspond to the notation on the surface of the document; a shape specification module 24 that specifies shape approximation lines Q that approximate the surface shape of the document from the plurality of line segments L; and an image correction module 26 that utilizes the shape approximation lines Q specified by the shape specification module 24 to correct the captured image GA. The program described above can be installed in a computer, i.e., provided in a form suitable for storage on a storage medium that can be read by the computer. The storage medium is, for example, a non-transitory (non-transitory) storage medium, where an optical storage medium such as a CD-ROM (optical disc) is a good example thereof, but may include well-known arbitrary storage medium formats, such as a semiconductor storage medium and a magnetic storage medium. Furthermore, it is also possible to deliver the program to the computer through a distribution system via a communication network.

(7) A preferred aspect of the present invention is also specified as an operation method (image correction method) of the image correction device 100 according to the above-described embodiments. For example, in the image correction method according to a preferred aspect of the present invention, a plurality of line segments L that correspond to the notation on the surface of a document are detected from a captured image GA obtained by photographing the document (SA1); shape approximation lines Q that approximate the surface shape of the document are specified from the plurality of line segments L (SA3); and the shape approximation lines Q are utilized to correct the captured image GA (SA4).

The image correction device according to a preferred aspect of the present invention comprises a line segment detection module that detects, from a captured image obtained by photographing a document, a plurality of line segments that correspond to the notation on the surface of the document; a shape specification module that specifies shape approximation lines that approximate the surface shape of the document from the plurality of line segments; and an image correction module that utilizes the shape approximation lines specified by the shape specification module to correct the captured image. In the aspect described above, a shape approximation line corresponding to the distribution of a plurality of line segments detected from a captured image obtained by photographing a document is specified, and the captured image is corrected utilizing said shape approximation line. Therefore, a distance measuring device for measuring the distance from the document at a plurality of points is not required, and it is possible to correct the distortion of an image caused by deformation of the surface of the document with a simple configuration and process.

In a preferred aspect of the present invention, the shape specification module specifies a shape approximation line so as to minimize a distance index obtained by adding the distance between a point of intersection, where a straight line passing through a specific point on the line segment intersects the shape approximation line, and the specific point, with respect to a plurality of line segments. In the aspect described above, since the shape approximation line is specified so as to minimize the distance index obtained by adding the distance between the point of intersection, where a straight line passing through a specific point on the line segment intersects the shape approximation line, and the specific point, with respect to a plurality of line segments, the distribution of the plurality of line segments is reflected by the shape approximation line; therefore, it is possible to specify an appropriate shape approximation line that approximates the surface shape of the document with high precision.

In a preferred aspect of the present invention, the line segment detection module detects a plurality of line segments from a captured image obtained by photographing a musical score including a plurality of staves arranged in parallel at intervals from each other, and the shape specification module specifies a shape approximation line from the plurality of line segments corresponding to two adjacent staves. In the aspect described above, since a shape approximation line is specified from a plurality of line segments corresponding to two adjacent staves, it is possible to specify an appropriate shape approximation line Q that approximates the surface shape of the document with high precision, compared with a configuration in which a shape approximation line is specified from only one staff.

In a preferred aspect of the present invention, the shape specification module executes a classification process for classifying a plurality of line segments into a plurality of clusters; a calculation process for calculating an adjustment value corresponding to the distance between a tangent to an ellipse, which represents the cluster to which said line segment belongs, at a point at which the ellipse intersects its minor axis, and the line segment; and an approximation process for specifying a shape approximation line so as to minimize a distance index obtained by adding the distance between a point of intersection, where a straight line passing through a specific point intersects the shape approximation line, and the specific point, and an adjustment value with respect to a plurality of line segments. In the aspect described above, an adjustment value is calculated according to the distance between a tangent to an ellipse of the cluster to which each line segment is classified and said line segment, and a shape approximation line is specified so as to minimize a distance index obtained by adding the distance between a point of intersection, where a straight line passing through a specific point intersects the shape approximation line, and the specific point, to the adjustment value, with respect to a plurality of line segments. Therefore, it is possible to specify a shape approximation line that approximates the surface shape of the document with high precision, even when a plurality of line segments are unevenly distributed on one side of two staves.

In a preferred aspect of the present invention, the shape specification module calculates an adjustment value by multiplying a predetermined coefficient to the distance between a tangent and a line segment, in a calculation process. In the aspect described above, it is possible to calculate the adjustment value by a simple calculation whereby a predetermined coefficient is multiplied by the distance between the tangent of the ellipse representing the cluster and the line segment within the cluster.

The present application is based on a Japanese Patent Application (Japanese Patent Application No. 2015-194928) filed on Sep. 30, 2015, and the contents thereof are incorporated herein by reference.

INDUSTRIAL APPLICABILITY

According to the present invention, it is possible to correct distortion of an image caused by deformation of the surface of a document with a simple configuration and processing.

What is claimed is:

1. An image correction device comprising:
an electronic controller including at least one processor, the electronic controller being configured to execute a plurality of modules including
a line segment detection module that detects a plurality of line segments corresponding to a notation on a surface of a document from a captured image obtained by photographing the document;
a shape specification module that specifies a shape approximation line that approximates a surface shape of the document from the plurality of line segments; and
an image correction module that utilizes the shape approximation line specified by the shape specification module to correct the captured image,
the shape specification module of the processor specifying the shape approximation line so as to minimize a distance index obtained by adding a distance between a point of intersection where a straight line passing through a specific point on the line segment intersects the shape approximation line, and the specific point with respect to the plurality of line segments.

2. The image correction device as recited in claim 1, wherein
the line segment detection module of the processor defines a plurality of unit areas in the captured image, and detects the plurality of line segments for each of the plurality of unit areas.

3. The image correction device as recited in claim 1, wherein
the notation on the surface of the document is a musical score including a plurality of staves arranged in parallel at an interval from each other.

4. The image correction device as recited in claim 3, wherein
the line segment detection module of the processor detects the plurality of line segments from the captured image obtained by photographing the musical score, and
the shape specification module of the processor specifies the shape approximation line from the plurality of line segments corresponding to two adjacent staves.

5. The image correction device as recited in claim 1, wherein
the line segment detection module of the processor detects the plurality of line segments from each of a plurality of captured images constituting a moving image obtained by photographing the document,
the shape specification module of the processor specifies the shape approximation line from the plurality of line segments for each of the plurality of captured images, and
the image correction module of the processor corrects each of the plurality of captured images utilizing the shape approximation lines specified for each of the plurality of captured images.

6. An image correction device comprising:
an electronic controller including at least one processor, the electronic controller being configured to execute a plurality of modules including
a line segment detection module that detects a plurality of line segments corresponding to a notation on a surface of a document from a captured image obtained by photographing the document;
a shape specification module that specifies a shape approximation line that approximates a surface shape of the document from the plurality of line segments; and
an image correction module that utilizes the shape approximation line specified by the shape specification module to correct the captured image,
the shape specification module of the processor executing
a classification process for classifying the plurality of line segments into a plurality of clusters,
a calculation process for calculating an adjustment value corresponding to the distance between a tangent to an ellipse, which represents one of the plurality clusters to which the line segment belongs, at a point at which the ellipse intersects its minor axis, and the line segment for each of the plurality of line segments, and
an approximation process for specifying the shape approximation line so as to minimize a distance index obtained by adding a distance between a point of intersection where a straight line passing through a specific point and intersects the shape approximation line, and the adjustment value with respect to the plurality of line segments.

7. The image correction device as recited in claim 6, wherein
the shape specification module of the processor calculates the adjustment value by multiplying a predetermined coefficient by the distance between a tangent and the line segment in the calculation process.

8. An image correction method comprising:
detecting a plurality of line segments corresponding to a notation on a surface of a document from a captured image obtained by photographing the document
specifying a shape approximation line that approximates a surface shape of the document from the plurality of line segments, and
using the specified shape approximation line to correct the captured image,
the specifying of the shape approximation line being performed so as to minimize a distance index obtained by adding a distance between a point of intersection where a straight line passing through a specific point on the line segment intersects the shape approximation line, and the specific point with respect to the plurality of line segments.

9. The image correction method as recited in claim 8, further comprising
defining a plurality of unit areas in the captured image, and
the detecting of the plurality of line segments includes detecting each of the plurality of unit areas.

10. The image correction method as recited in claim 8, wherein
the notation on the surface of the document is a musical score including a plurality of staves arranged in parallel at an interval from each other.

11. The image correction method as recited in claim 10, wherein
the detecting of the plurality of line segments from the captured image is obtained by photographing the musical score, and
the specifying of the shape approximation line from the plurality of line segments corresponds to two adjacent staves.

12. The image correction method as recited in claim 8, wherein
the detecting of the plurality of line segments includes detecting of the plurality of line segments from each of a plurality of captured images constituting a moving image obtained by photographing the document,
the specifying of the shape approximation line from the plurality of line segments is performed for each of the plurality of captured images, and further comprising
correcting each of the plurality of captured images utilizing the shape approximation lines specified for each of the plurality of captured images.

13. An image correction method comprising:
detecting a plurality of line segments corresponding to a notation on a surface of a document from a captured image obtained by photographing the document;
specifying a shape approximation line that approximates a surface shape of the document from the plurality of line segments, and
using the specified shape approximation line to correct the captured image,
the specifying of the shape approximation line including
classifying the plurality of line segments into a plurality of clusters,
calculating an adjustment value corresponding to the distance between a tangent to an ellipse, which represents one of the plurality clusters to which the line segment belongs, at a point at which the ellipse intersects its minor axis, and the line segment for each of the plurality of line segments, and
an approximation process for the specifying of the shape approximation line includes an approximation process that minimizes a distance index obtained by adding a distance between a point of intersection where a straight line passing through a specific point and intersects the shape approximation line, and the adjustment value with respect to the plurality of line segments.

14. The image correction method as recited in claim 12, wherein
the calculating of the adjustment value is performed by multiplying a predetermined coefficient by the distance between a tangent and the line segment.

* * * * *